(12) United States Patent
Prouzet

(10) Patent No.: US 10,557,516 B2
(45) Date of Patent: Feb. 11, 2020

(54) BRAKE DEVICE

(71) Applicant: Ratier-Figeac SAS, Figeac (FR)

(72) Inventor: Bertrand Prouzet, Figeac (FR)

(73) Assignee: RATIER-FIGEAC SAS, Figeac (FR)

( * ) Notice: Subject to any disclaimer, the term of this patent is extended or adjusted under 35 U.S.C. 154(b) by 47 days.

(21) Appl. No.: 15/908,971

(22) Filed: Mar. 1, 2018

(65) Prior Publication Data
US 2018/0259032 A1 Sep. 13, 2018

(30) Foreign Application Priority Data

Mar. 9, 2017 (EP) ..................................... 17305253

(51) Int. Cl.
| | |
|---|---|
| F16F 13/06 | (2006.01) |
| F16D 63/00 | (2006.01) |
| F16F 7/09 | (2006.01) |
| F16F 9/20 | (2006.01) |
| B64C 27/12 | (2006.01) |
| F16F 7/08 | (2006.01) |
| F16D 121/16 | (2012.01) |

(52) U.S. Cl.
CPC .............. *F16F 13/06* (2013.01); *B64C 27/12* (2013.01); *F16D 63/008* (2013.01); *F16F 7/087* (2013.01); *F16F 7/09* (2013.01); *F16F 9/20* (2013.01); *F16D 2121/16* (2013.01)

(58) Field of Classification Search
CPC .... F16F 13/06; F16F 7/09; F16F 7/087; F16F 9/20; F16D 63/008; F16D 2121/16; B64C 27/12
See application file for complete search history.

(56) References Cited

U.S. PATENT DOCUMENTS

| 2,437,631 A | * | 3/1948 | Wood ...................... F16F 1/041 |
| | | | 248/613 |
| 3,217,842 A | * | 11/1965 | Forwald .................. F15B 21/10 |
| | | | 188/289 |

(Continued)

FOREIGN PATENT DOCUMENTS

| CN | 104290905 A | 1/2015 |
| GB | 1059880 A | 2/1967 |

OTHER PUBLICATIONS

Extended European Search Report for International Application No. 17305253.1 dated Sep. 25, 2017, 5 pages.

*Primary Examiner* — Vishal R Sahni
(74) *Attorney, Agent, or Firm* — Cantor Colburn LLP

(57) ABSTRACT

A module for a braking system includes a movable housing configured to transfer a braking force from an input shaft to an output shaft, a first movable member slidably received within the housing and connected to the output shaft, a second movable member slidably received within the housing, a first resilient member biased between the first movable member and the second movable member, such that a force applied to the second movable member is applied to the first movable member via the first resilient member, and a second resilient member biased between the second movable member and the housing, such that a force applied to the housing is applied to the second movable member via the second resilient member. The first resilient member yields or compresses upon application of a first braking force to the input shaft, and the second resilient member yields or compresses after the first resilient member.

17 Claims, 5 Drawing Sheets

(56) References Cited

U.S. PATENT DOCUMENTS

| | | | | |
|---|---|---|---|---|
| 3,895,695 | A | * | 7/1975 | Hunter .................. B60T 13/261 |
| | | | | 188/170 |
| 4,532,462 | A | * | 7/1985 | Washbourn ........... B60T 8/1893 |
| | | | | 188/162 |
| 4,546,298 | A | * | 10/1985 | Wickham .............. B60T 8/1893 |
| | | | | 188/162 |
| 4,697,798 | A | * | 10/1987 | Pitter ...................... G01L 5/103 |
| | | | | 248/542 |
| 6,193,189 | B1 | | 2/2001 | Keever |
| 6,435,321 | B1 | * | 8/2002 | Asano ...................... F16D 65/14 |
| | | | | 188/170 |
| 6,564,976 | B2 | * | 5/2003 | Bettinger .............. G01F 11/021 |
| | | | | 222/340 |
| 6,702,072 | B2 | * | 3/2004 | Asano .................. B60T 17/083 |
| | | | | 188/170 |
| 6,902,043 | B2 | * | 6/2005 | Plantan ................... B60T 13/22 |
| | | | | 188/170 |
| 7,677,539 | B2 | * | 3/2010 | Adoline ................ F16F 13/007 |
| | | | | 188/304 |
| 2004/0150143 | A1 | * | 8/2004 | Zimmer ................... E05F 5/02 |
| | | | | 267/64.11 |
| 2015/0184713 | A1 | * | 7/2015 | Roos ....................... B60T 7/085 |
| | | | | 188/158 |

\* cited by examiner

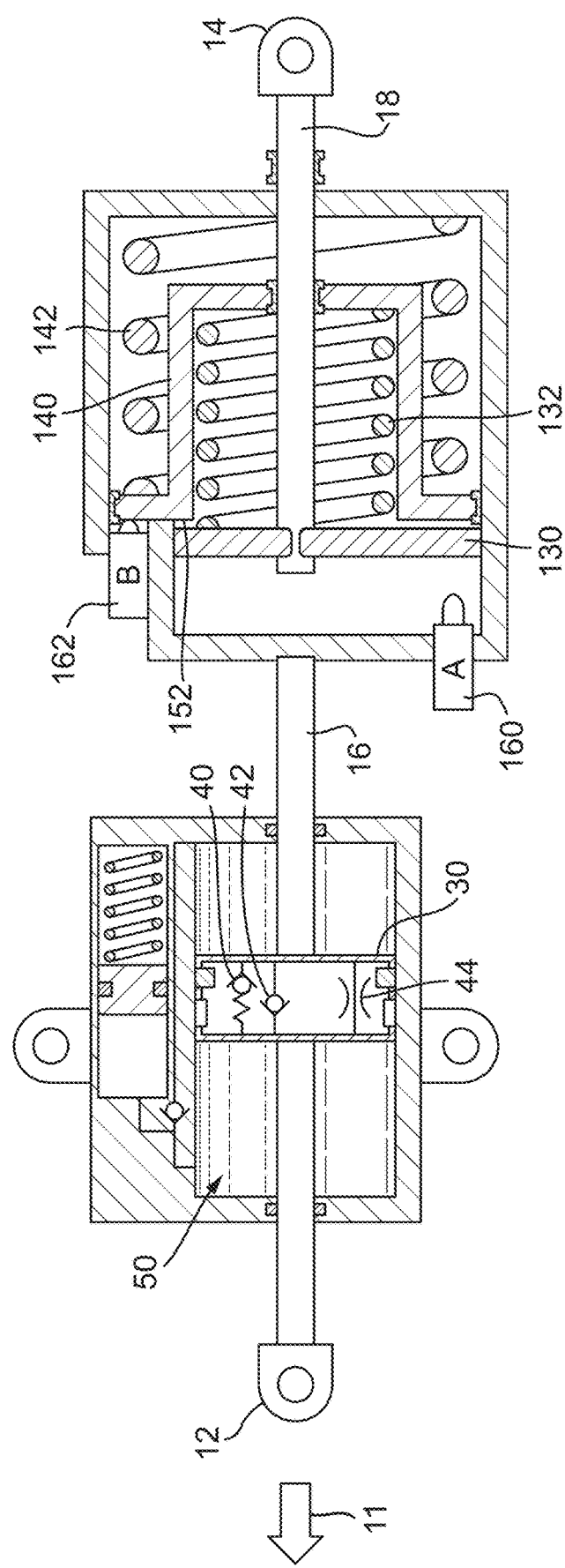

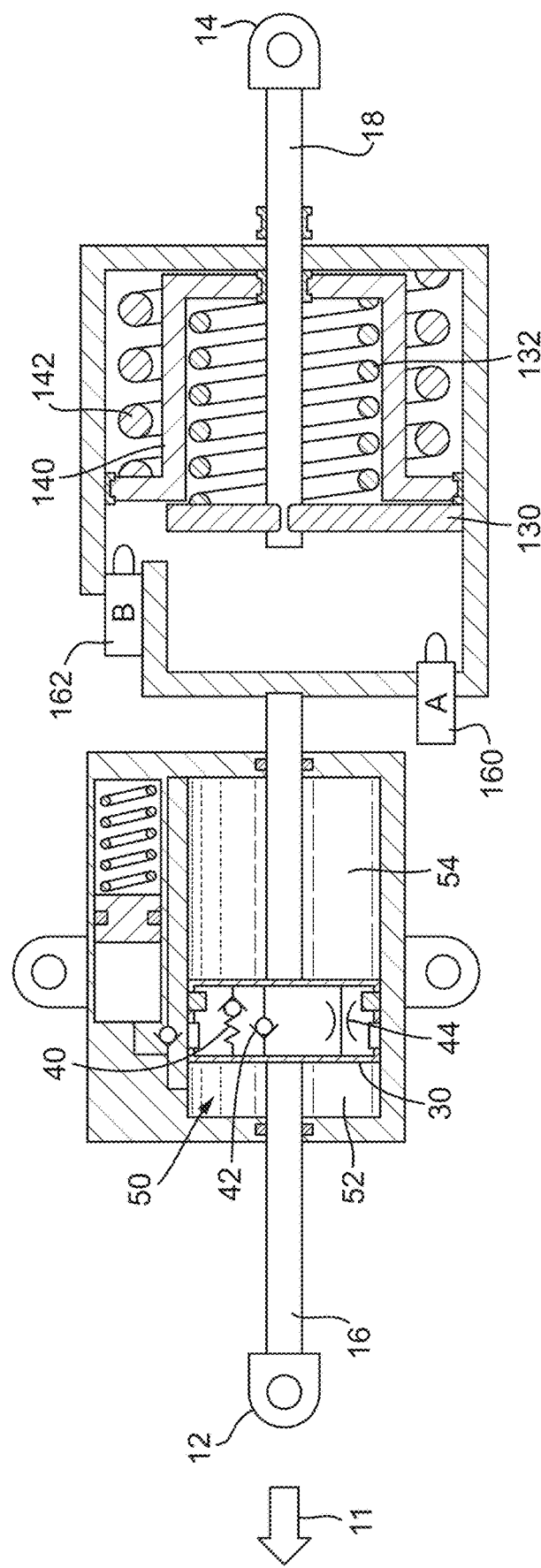

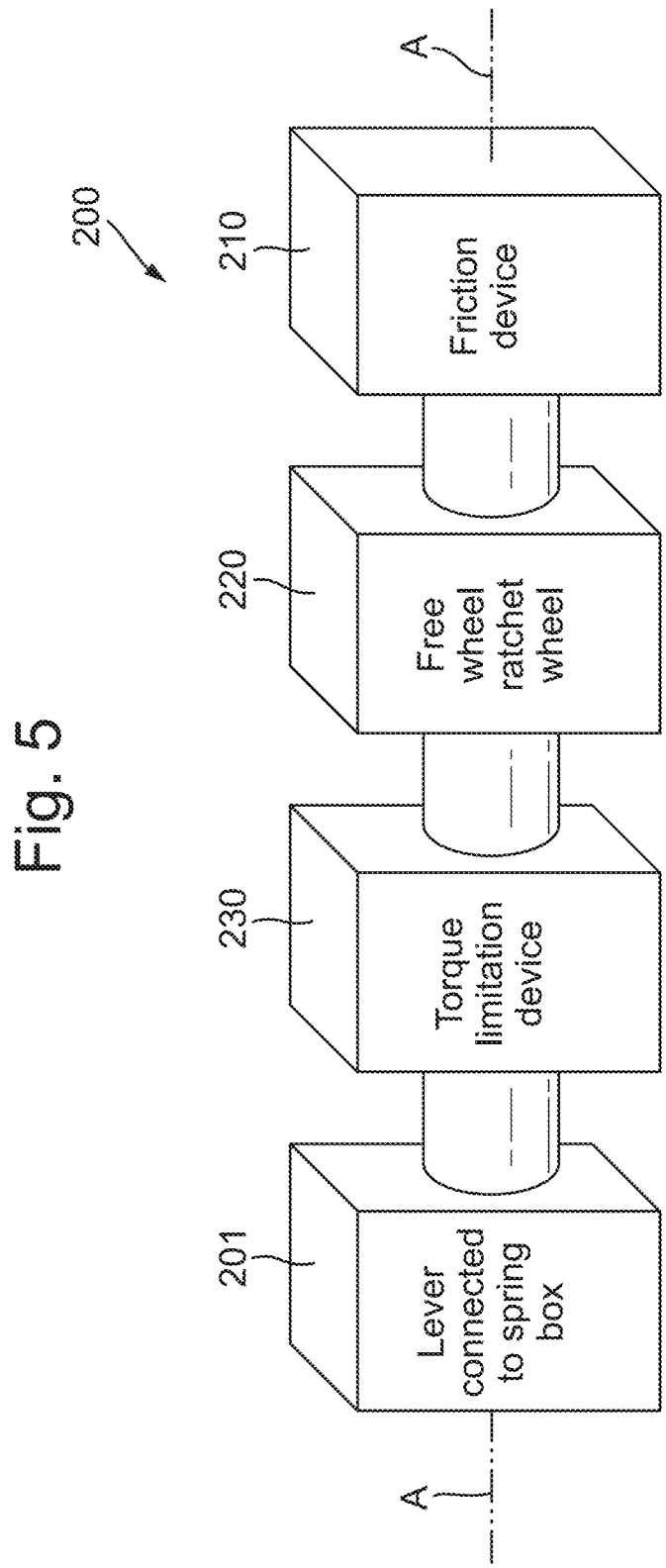

BRAKE DEVICE

FOREIGN PRIORITY

This application claims priority to European Patent Application No. 17305253.1 filed Mar. 9, 2017, the entire contents of which is incorporated herein by reference.

FIELD

The present disclosure relates generally to a brake device for a rotor, and in particular a brake device for the rotor of a helicopter.

BACKGROUND

Rotor brakes, in particular those associated with a helicopter, are typically designed to offer multiple functions. Dynamical braking refers to the braking required to stop the rotor quickly once the engine is switched off. At the start of dynamical braking the rotor is typically rotating. Parking braking refers to the engagement of the brake to lock the rotor and prevent unwanted rotor rotation, for example windmill effects. At the start of parking braking the rotor is typically not rotating, or maybe rotating a limited amount, e.g. due to windmill effects. A further function may be referred to as static braking, which refers to engagement of the brake, soon after which at least one engine is switched on. During static braking the brake holds the rotor against rotation and must be able to counter the motor torque without slippage of the rotor. At the start of static braking the rotor is typically not rotating.

As may be appreciated, the load requirements for static braking are often higher than those needed for dynamical and/or parking braking, due to the additional torque applied by the motor. Furthermore, it should be noted that if brake slippage occurs during static braking, and while the engine is on, safety may be compromised due to overheating.

Braking systems for rotors typically employ a brake disc attached to the rotor, and opposed friction surfaces either side of the brake disc that are configured to come together to contact the brake disc and apply a braking force. A caliper may hold the friction surfaces in position and be connected to an actuator adapted to control the application of the braking force. The current conventional arrangements typically use a mechanical, hydraulic or electric actuator. The conventional arrangements may have certain reliability issues, as well as increased design and manufacturing costs.

It is desired to provide an improved brake device for a rotor, such as a helicopter rotor, with a particular focus on the actuation of the brake.

SUMMARY

In accordance with an aspect of the present disclosure, there is provided a module for a braking system, comprising: a movable housing configured to transfer a braking force from an input shaft to an output shaft; a first movable member slidably received within the housing and connected to the output shaft; a second movable member slidably received within the housing; a first resilient member biased between the first movable member and the second movable member, such that a force applied to the second movable member is applied to the first movable member via the first resilient member; and a second resilient member biased between the second movable member and the housing, such that a force applied to the housing is applied to the second movable member via the second resilient member; wherein the first resilient member is configured to yield or compress upon application of a first, relatively low braking force to the input shaft, and the second resilient member is configured to yield or compress after the first resilient member and upon application of a second, relatively high braking force to the input shaft, wherein the relatively low braking force is less than the relatively high braking force.

The above module provides a two-stage braking system, that can be used in situations such that the braking load applied to, e.g., a brake disc can be separated into two distinct stages. The first stage may correspond to the yielding or compressing of the first resilient member upon application of a low braking force, and the second stage may correspond to the yielding or compressing of the second resilient member upon application of a high braking force.

In the example of a vehicle (e.g., helicopter) rotor, the first stage may be a dynamical braking stage, which as discussed above typically requires a lower braking load, and the second stage may be a static braking stage, which typically requires a higher braking load. The module may be located between a control lever of the braking system of the vehicle and an actuator configured to apply the braking load via one or more friction surfaces.

The second resilient member may be configured to yield or compress after the first resilient member, e.g., due to the increase in applied force to the input shaft, e.g., from the first, relatively low braking force to the second, relatively high braking force. The second resilient member may not yield or compress upon application of the first, relatively low braking force (which may be sufficient to cause the first resilient member to yield or compress).

The relatively low braking force may be less than the relatively high braking force, for example the relatively low braking force may be less than 50%, 40%, 30%, 20% or 10% of the relatively high braking force. The first resilient member may be configured to yield or compress fully before the second resilient member starts to yield or compress.

Upon yielding of the first resilient member, the first movable member may be configured to slide within the housing and contact the second movable member, such that a force applied to the second movable member may be applied directly to the first movable member. Similarly, upon yielding of the second resilient member, the second movable member may be configured to slide within the housing and contact a portion of the housing, such that a force applied to the housing may be applied directly to the second movable member.

The first resilient member may have a lower preload than the second resilient member, such that the first resilient member yields prior to the second resilient member as aforesaid. "Preload" as defined herein may refer to the load required to overcome a resilient member such that it yields or compresses. This will be affected by various factors, for example, in the case of the spring, its spring constant. However, the preload will also depend on how the resilient member is incorporated into the module itself, and, e.g., the load applied to it by the various other components.

The first resilient member may be a first spring, and/or the second resilient member may be a second spring.

The module may further comprise one or more sensors configured to detect the position of the first movable member and/or the second movable member within the housing. The one or more sensors may, alternatively or additionally, be configured to detect whether the first resilient member and/or the second resilient member have yielded or compressed, and may be configured to detect an amount of compression of the first resilient member and/or the second resilient member.

A control system or other computer may be provided and may be in communication with the one or more sensors. The control system or other computer may comprise an output device (e.g., a display) configured to display messages to a user.

A first of the one or more sensors may be configured to detect movement of the first movable member and/or first resilient member, and output a first signal to the control system or other computer when the first movable member and/or first resilient member moves from its initial or rest position, for example upon yielding of the first resilient member.

A second of the one or more sensors may be configured to detect movement of the second movable member and/or second resilient member, and output a second, different signal to a control system or other computer when the second movable member and/or second resilient member moves from its initial or rest position, for example upon yielding of the second resilient member.

The control system or other computer may be configured to receive the first signal and the second signal and output a status of the applied braking load based on whether it has received at least one of the first signal and the second signal. For example, if the control system or other computer receives the first signal but not the second signal, it may output a status that the applied braking load is a relatively low braking load (e.g., a dynamical braking load). Furthermore, if the control system or other computer receives the second signal (and optionally the first signal as well), it may output a status that the applied braking load is a relatively high braking load (e.g., a static braking load).

One of said one or more sensors (and/or the control system or other computer) may be configured to detect whether the second resilient member yields at substantially the same time as the first resilient member (e.g., upon application of the first, relatively low braking force), and optionally with no increase in applied braking force to the input shaft, and communicate a safety warning if such movement is detected. The safety warning may be necessary to indicate that the second resilient member is faulty, and the module cannot provide a relatively high braking load.

In accordance with an aspect of the present invention, there is provided a brake device comprising a first module and a second module, wherein the second module is a module as described above, and the first module comprises a damping apparatus configured to dampen the movement of the first movable member and/or the second movable member upon release of a braking force applied to the input shaft. This helps to prevent rapid release of the components of the second module, and subsequent damage to the braking system that may be caused as a result.

The damping apparatus may be configured such that substantially no damping force is applied to the first movable member and/or the second movable member by the damping apparatus upon application of a braking force to the input shaft. In other words, the damping apparatus only dampens the movement of the first movable member and/or the second movable member when the brake is retracting, or the braking force is released.

The damping apparatus may comprise a torque or load limiter, or fuse device configured to bypass the damping provided by the damping apparatus. By "bypass", it is meant that any damping provided by the damping apparatus may be removed or rendered inoperable, for example to allow the retraction speed of the brake to be increased.

The damping apparatus may comprises a piston connected to the input shaft and movable within a chamber containing a damping fluid, wherein one or more passages may be provided within the piston to allow the damping fluid to flow from one side of the piston (30) to the other. The one or more passages may comprise a first passage comprising a flow restrictor, and the flow restrictor may be configured to permit the flow of fluid across the piston via a restriction, such that the flow rate of fluid through the first passage is limited The one or more passages may comprise a second passage comprising a check valve, and the check valve may be configured to restrict the flow of fluid through the first passage in a first direction, but allow the flow of fluid through the first passage in a second, opposite direction.

The damping apparatus may, additionally or alternatively comprise a mechanical friction device configured to apply a frictional resistance to a component associated with the input shaft, thereby slowing the retraction of the input shaft as it travels towards its rest position upon release of a braking force applied to the input shaft.

The brake device may further comprise a ratchet wheel or other device configured to substantially disconnect the mechanical resistance device from the applying a frictional resistance during the application of a braking force to the input shaft.

In accordance with an aspect of the present invention, there is provided a method of controlling a braking force using a module or brake device as described above and herein, the method comprising: applying a first, relatively low braking force to the input shaft, wherein the first braking force is sufficient to cause the first resilient member to yield or compress, but insufficient to cause the second resilient member to yield or compress; and applying a second, relatively high braking force to the input shaft, wherein the second braking force is higher than the first braking force and is sufficient to cause both the first resilient member and the second resilient member to yield or compress.

This may achieve a further object of the present disclosure, in that an increased braking force is required to transition from the first stage of braking (using the compression of the first resilient member) and the second stage of braking (using the compression of the second resilient member).

BRIEF DESCRIPTION OF THE DRAWINGS

Various embodiments will now be described, by way of example only, and with reference to the accompanying drawings in which:

FIG. 3 shows the brake device of FIG. 1 during dynamical braking;

FIG. 4 shows the brake device of FIG. 1 during static braking;

FIG. 5 shows the location of the friction device in one embodiment of the present disclosure.

DETAILED DESCRIPTION

Figure 1:
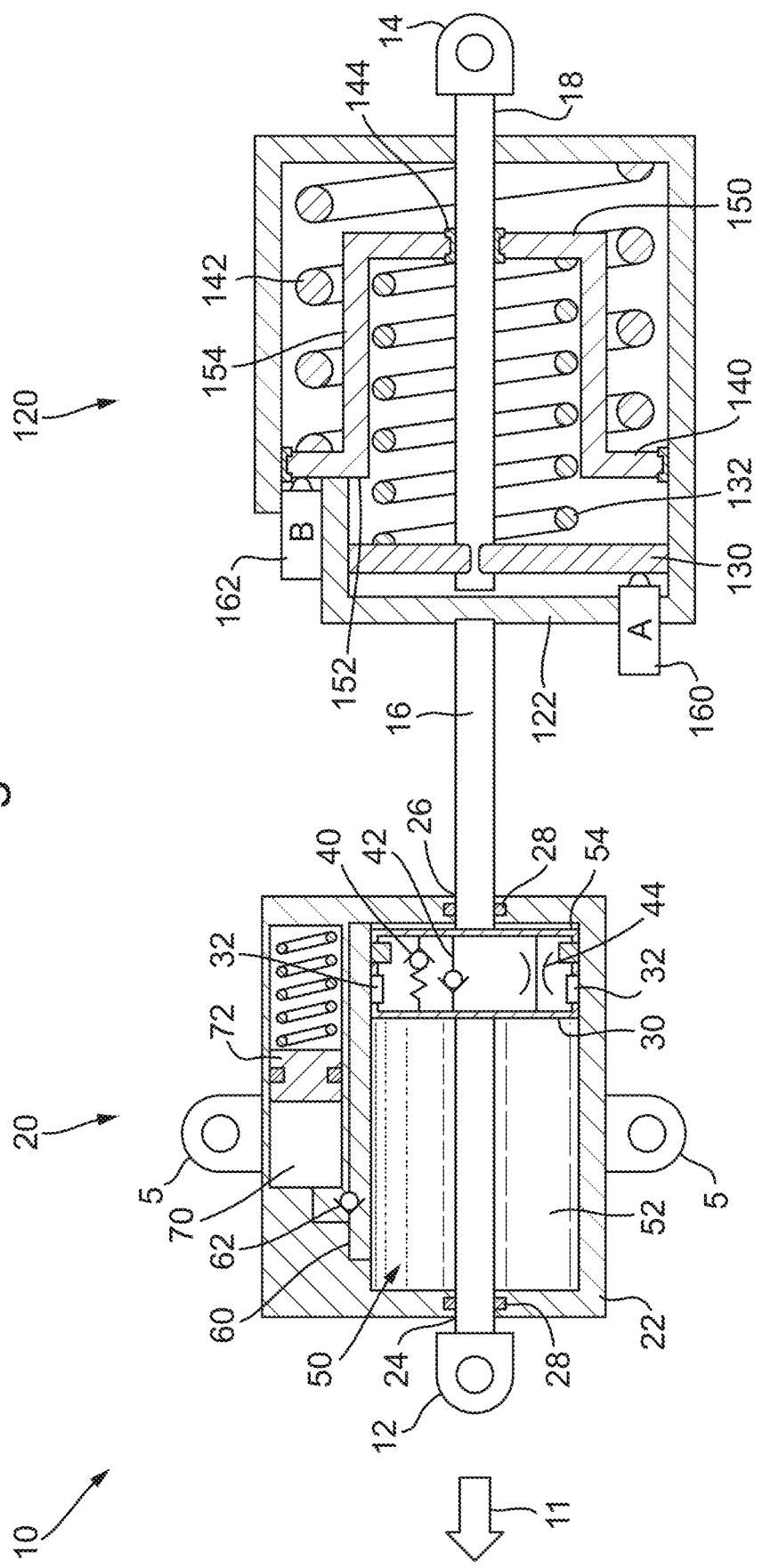
FIG. 1 shows a brake device of the disclosure in a released position.

A brake device 10 is shown in FIG. 1 and may be placed between a control lever and a braking system in order to vary the load applied to a brake for a rotor, for example the rotor of a vehicle (e.g., a helicopter). A control system may be provided to move the various parts, and monitor the various components. Alternatively, this may be done manually.

A first connector 12 may be located at one end of the device 10, and may be operatively connected to the control lever for applying and releasing a braking load. A second connector 14 may be provided, and is optionally located at the other end of the device 10, and may be operatively connected to the braking system, such that a pulling load on the control lever (e.g., in the direction of arrow 11) causes a pulling load on the braking system that applies a brake. This operation will be described below. In alternative embodiments, a pushing load could be used in place of a pulling load. As will be appreciated by the skilled practitioner, substantially the same components as described below could be used, but with, e.g., their direction reversed. Other embodiments are envisaged in which a combination of pushing and pulling loads could be used.

The brake device 10 comprises a first, damper module 20 and a second, spring module 120. In the illustrated embodiment these are shown as separate modules spaced apart linearly, although various embodiments are envisaged in which the modules are integrated differently.

A first shaft 16 operatively connects the first connector 12 to the spring module 120, which first shaft 16 also runs through the damper module 20. Movement of the first shaft 16 causes a corresponding movement of the spring module 120, and is damped by the damper module 20.

A second shaft 18 operatively connects the spring module 120 and the second connector 14. Movement of the spring module 120 causes movement of the second shaft 18, but only after certain resilient (e.g., spring) forces have been overcome, as described in more detail below.

The damper module 20 may comprise a housing 22 comprising a shaft inlet 24 and a shaft outlet 26. The first shaft 16 passes through, and is slidably received within the housing 22 from the shaft inlet 24 to the shaft outlet 26. One or more seals 28 are located within the shaft inlet 24 and the shaft outlet 26 to prevent fluid from being released through the shaft inlet 24 and shaft outlet 26.

The housing 22 of the damper module 20 may be static, e.g., fixed in position relative to the structure of the vehicle to which the brake system is attached. The damper module 20 may be connected to the vehicle via connecting members 5.

A piston 30 is attached to and moves with the first shaft 16, and is slidably received within a chamber 50 located within the damper module 20. The piston 30 is sealed against the walls of the chamber 50 (e.g., using seals 32) so as to create a first sub-chamber 52 on one side of the piston 30 and a second sub-chamber 54 on the other side of the piston 30. As will be appreciated, the volumes of the first sub-chamber 52 and the second sub-chamber 54 are variable and depend on the position of the piston 30 within the chamber 50.

Within the piston 30 there are one or more passages. In the illustrated example, three passages are shown, and any or all of these may be used (or not used) in the various embodiments disclosed herein. Each of the passages fluidly connect the first sub-chamber 52 with the second sub-chamber 54, and contains a component 40, 42, 44 that provides a certain function.

A first of the passages may contain a flow restrictor 44, which permits the flow of fluid between the first sub-chamber 52 and the second sub-chamber 54, but via a flow control device, for example a restrictor (e.g., a suitable flow restriction) or flow regulator (e.g., an electrically controlled flow regulator), such that the flow rate of fluid through the first passage is limited.

A second of the passages may contain a check valve 42 which restricts the flow of fluid through that passage from the second sub-chamber 54 to the first sub-chamber 52, but allows fluid to flow in the other direction through the second passage, i.e., from the first sub-chamber 52 to the second sub-chamber 54.

A third of the passages may contain a safety release valve 40, for example a pressure valve biased to a close position (e.g., a spring-loaded check valve), which opens if the pressure in the second sub-chamber 54 is significantly higher (e.g., by a predetermined amount) than the pressure in the first sub-chamber 52. This may be caused by the control lever being used to force a faster release of the braking load than is otherwise permitted (described in more detail below).

A passage 60 may be located in the housing 22 and may fluidly connect the first sub-chamber 52 with the second sub-chamber 54 to permit fluid to flow therebetween. A check valve 62 may be located in the passage 60 to permit the flow of fluid from the first sub-chamber 52 to the second sub-chamber 54, and prevent the flow of fluid in the opposite direction, that is from the second sub-chamber 54 to the first sub-chamber 52. This can ensure that fluid is only permitted to flow from the second sub-chamber 54 to the first sub-chamber 52 through the piston 50.

A damping fluid is contained within the various chambers and sub-chambers of the housing 22. The damper module 20 may further comprise a reservoir 70 of damping fluid such that fluid can be added and removed from the system, e.g., due to temperature variations and/or leaks. A spring-loaded piston 72 may be provided in order to control the volume of fluid in the reservoir 70.

Referring now to the spring module 120, this comprises a housing 122 to which the first shaft 16 connects, such that movement of the first shaft 16 (e.g., along its axis) causes a corresponding movement of the housing 122 (e.g., along the same axis).

The spring module 120 comprises a first movable member 130 and a second movable member 140. The first movable member 130 is slidably received within the housing 122, and connected to the second shaft 18. Movement of the first movable member 130 causes a corresponding movement of the second shaft 18.

The second movable member 140 is also slidably received within the housing 122. The second shaft 18 extends through an aperture 144 in the second movable member 140, and a suitable bearing (e.g., a low-friction surface) may be provided to allow the second shaft 18 to slide freely through the aperture 144.

The second movable member 140 may be cup-shaped, such that the second movable member 140 comprises a top portion or rim 152 and a bottom portion 150, with a middle portion 154 connecting the top portion 152 with the bottom portion 150.

A first spring 132 may be located at least partially within the second movable member 140, and biased between the bottom portion 150 of the second movable member 140 and the first movable member 130. A second spring 142 may be biased between a portion of the housing 122 and the top portion 152 of the second movable member 140.

A first position sensor 160 may be provided and configured to determine the position of the first movable member 130 within the housing 122. A second position sensor 162 may be provided and configured to determine the position of the second movable member 140 within the housing 122.

A typical braking sequence will now be described with reference to FIGS. 2, 3 and 4, which show the same brake device 10 of FIG. 1 during different phases of the braking sequence.

Figure 2:
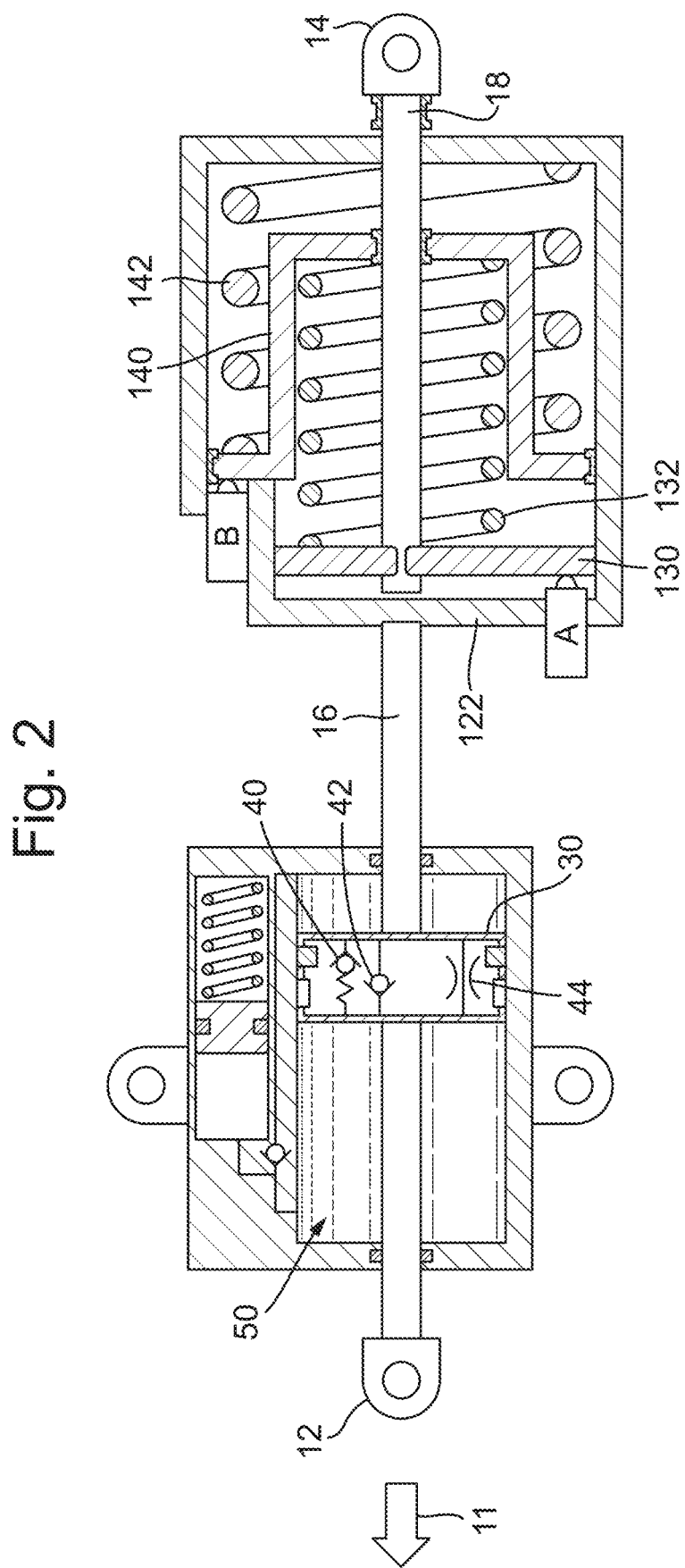
FIG. 2 shows the brake device of FIG. 1 shortly after a braking load is applied.

The phase depicted in FIG. 2 may be referred to as an approach phase, corresponding to the stroke necessary to put the friction element of the brake into contact with the braking surface (e.g., a brake disc).

That is, FIG. 2 shows the brake device 10 upon initial application of a pulling load in the direction of arrow 11. Such a pulling load will cause the first connector 12 to move in this direction, as well as the first shaft 16 and the housing 122 of the spring module 120. This pulling load is transferred from the housing 122 of the spring module 120 to the second shaft 18 via the second spring 142, the second movable member 140, the first spring 132 and the first movable member 130 (in that order). Thus, the second shaft 18 may also move in the direction of arrow 11.

The first spring 132 and the second spring 142 may be configured such that during the approach phase they transfer the pulling load (which may be a first pulling load) from the housing 122 to the second shaft 18 without substantially compressing (e.g., without compressing at all). This may be achieved by using a first spring 132 (and/or a second spring 142) with a spring constant or preload that is higher than the resisting load generated by the braking system (e.g., the load on or attached to the second connector 14).

During the approach phase damping fluid will travel through the second passage and check valve 42 to allow the piston 30 to move substantially freely within the chamber 50. In other words, and functionally, the damper module 20 will not substantially resist the application of the pulling load in the direction of arrow 11.

The first shaft 16, the housing 122 of the spring module 120, and the second shaft 18 will move in the direction of arrow 11 until the friction element of the brake contacts the braking surface. At this point, and upon further application of a pulling load in this direction, the approach phase transitions to a dynamical braking phase.

FIG. 3 shows the brake device 10 during the dynamical braking phase.

Once the friction element of the brake pad contacts the braking surface, the resisting load generated by the braking system (e.g., the load on or attached to the second connector 14) will sharply and/or suddenly increase. The pulling load may remain the same as that used during the approach phase, i.e., a first pulling load and may be referred to as a dynamical braking load. At this point the resisting load may be be higher than the spring constant or preload of the first spring 132, such that the first spring 132 begins to compress or otherwise yield. This causes the first movable member 130 to slide towards the second movable member 140 as shown in FIG. 3, which it will do until it abuts the top portion or rim 152 of the second movable member 140.

During the dynamical braking phase the piston 30 continues to move within the chamber 50, which movement is permitted by the check valve 42. The first position sensor 160 (which may be a simple switch) senses that the first movable member 130 has moved from its initial position, and may be configured to send a signal to a central computer or control system, for example to notify a pilot of the vehicle that the brake is applied, and the load applied is sufficient for dynamical braking.

At this point (e.g., during the dynamical braking phase) if the second position sensor 162 senses that the second movable member 140 moves from its initial position, this could imply that the brake device 10 may not be able to provide a static braking load, for example due to the second spring 142 being damaged, or otherwise faulty. This is because the pulling load (e.g., the first pulling load or dynamical braking load) applied during the dynamical braking phase should not be sufficient to compress the second spring 142. In embodiments, therefore, if the second position sensor 162 senses that the second movable member 140 moves from its initial position during a time in which the pulling load applied is a dynamical braking load, the control system may communicate a safety warning that static braking is not possible.

FIG. 4 shows the brake device 10 during a static braking phase.

In order to move the brake device 10 to the static braking phase an increased pulling load is applied in the direction of arrow 11. This increased pulling load should be sufficient to cause the second spring 142 to compress such that an increased load is applied to the friction surface of the braking system, e.g., via the first spring 132, the first movable member 130 and the second shaft 18, respectively. The increased pulling load may be referred to as a second pulling load or static braking load, which may be greater than the first pulling load or dynamical braking load.

In order to apply the different braking loads, the control level of the braking system may have a given stroke, and the transition from a dynamical braking load to a static braking load may be caused by the control lever. For example, the control lever may have an intermediate stroke region (e.g., at half stroke), which is after the stroke required to bring the brake pad into contact with the brake disc (approach phase), during which movement the control lever is configured to apply a or the first, relatively low braking force to the input shaft 16. After the control lever has passed the intermediate region, the first resilient member 132 may be fully compressed, and the static braking phase may be activated. In this manner, it will be appreciated that the braking system of the present embodiment is able to provide two distinct levels of braking, even though the control lever is moving continuously through a complete stroke.

As with the dynamical braking phase discussed above, the piston 30 is permitted to move within the chamber 50 by check valve 42. The second position sensor 162 may sense that the second movable member 140 has moved from its initial position, e.g., due to the increased pulling load, and may be configured to send a signal to the central computer or control system, for example to notify a pilot of the vehicle that a static braking load is now applied.

As will be appreciated, the damper module 20 does not provide a significant damping function during the approach phase, the dynamical braking phase or the static braking phase, and permits movement of the piston 30 substantially freely within the chamber 50 during these phases.

Upon release of the pulling load in the direction of arrow 11 (e.g., when the brake is released during what may be referred to as a release phase) the damper module 20 may be configured to control the release speed of the various components in order to ensure a smooth transition back to the release position (see e.g., FIG. 1). During the release phase, the first spring 132 and the second spring 142 will decompress such that the first movable member 130 and the second movable member 140 move towards their released positions.

The speed at which the first movable member 130 and the second movable member 140 move will be governed in part by the ability of the piston 30 to move within the chamber 50 in the direction opposite to the arrow 11. The speed of the piston 30 in this direction is limited by the flow restrictor 44, which limits the amount of damping fluid that can flow from the second sub-chamber 54 to the first sub-chamber 52.

In this manner, the release speed of the brake device 10 is controlled and limited by the damper module 20.

The damper module 20 may be provided with a safety relief valve 40 as described above. This can be used to bypass the damping provided by the flow restrictor 44, for example to release the brake more quickly. During a release phase, the safety relief valve 40 will only open if the relative pressure across the relief valve is greater than a predetermined amount. In the present example, the pressure of the fluid in the second sub-chamber 54 must be significantly greater (e.g., by the predetermined amount) than the pressure of the fluid in the first sub-chamber 52. This significant pressure differential may be caused, for example, by application of an overload on the control lever to force the first shaft 16 in a direction opposite to the arrow 11. The overload may refer to an increased force in the direction opposite to that used to actuate the brake (e.g., in the case of the embodiment of FIGS. 1-4, a pushing force on the first connector 12). As will be appreciated, the predetermined amount of pressure differential and/or overload required to overcome the safety relief valve 40 will depend on the system in question.

In the broadest aspects of the present disclosure, a spring module 120 may be provided in isolation, for example without a damper module 20. This would still provide the function of delivering separate braking loads during dynamical braking and static braking.

In various embodiments, the damper module 20 may be replaced by any damping apparatus that provides a damping function.

For example, as shown in FIG. 5, a damping apparatus 200 is shown, and comprises a mechanical resistance device 210 that may be installed, for example, on the axis A of the control lever 201. The mechanical resistance device 210 may be a resistance or friction strap on a cylinder, although any type of device that provides a resistance (e.g., a frictional resistance) to the retraction of the brake may be used, for example a magnetic friction device or hydraulic friction device.

As with the damper module 20 discussed above, the mechanical resistance device 210 may only provide a substantial damping function during a release phase of the braking system, and may not provide a substantial damping function during the approach phase, the dynamical braking phase or the static braking phase. A ratchet wheel 220 may be installed between the control lever 201 and the mechanical resistance device 210 in order to substantially disconnect the mechanical resistance device 210 from the control lever 201 during these phases. A torque limiter or fuse device 230 may also be integrated into the damping apparatus to bypass the damping provided by the mechanical resistance device 210, for example to release the brake more quickly.

Although the present invention has been described with reference to preferred embodiments, it will be understood by those skilled in the art that various changes in form and detail may be made without departing from the scope of the invention as set forth in the accompanying claims.

The invention claimed is:

1. A helicopter rotor brake device, the braking device comprising:
a module, the module including:
a movable housing configured to transfer a braking force from an input shaft to an output shaft;
a first movable member slidably received within the housing and connected to the output shaft;
a second movable member slidably received within the housing;
a first resilient member biased between the first movable member and the second movable member, such that a force applied to the second movable member is applied to the first movable member via the first resilient member; and
a second resilient member biased between the second movable member and the housing, such that a force applied to the housing is applied to the second movable member via the second resilient member;
wherein the first resilient member is configured to yield or compress upon application of a first, relatively low braking force to the input shaft, and the second resilient member is configured to yield or compress after the first resilient member and upon application of a second, relatively high braking force to the input shaft, wherein the relatively low braking force is less than the relatively high braking force.

2. A brake device as claimed in claim 1, wherein, upon yielding of the first resilient member, the first movable member is configured to slide within the housing and contact the second movable member, such that a force applied to the second movable member is applied directly to the first movable member.

3. A brake device as claimed in claim 1, wherein, upon yielding of the second resilient member, the second movable member is configured to slide within the housing and contact a portion of the housing, such that a force applied to the housing is applied directly to the second movable member.

4. A brake device as claimed in claim 1, wherein the first resilient member has a lower preload than the second resilient member, such that the first resilient member yields prior to the second resilient member as aforesaid.

5. A brake device as claimed in claim 1, wherein the first resilient member is a first spring, and the second resilient member is a second spring.

6. A brake device as claimed in claim 1, wherein the module further includes one or more sensors configured to detect the position of the first movable member and/or the second movable member within the housing.

7. A brake device as claimed in claim 6, wherein:
a first of the one or more sensors is configured to detect movement of the first movable member and/or first resilient member, and output a first signal to a control system or other computer when the first movable member and/or first resilient member moves from its initial or rest position upon yielding of the first resilient member; and
a second of the one or more sensors is configured to detect movement of the second movable member and/or second resilient member, and output a second, different signal to the control system or other computer when the second movable member and/or second resilient member moves from its initial or rest position upon yielding of the second resilient member.

8. A brake device as claimed in claim 6, wherein one of said one or more sensors is configured to detect whether said second resilient member yields at substantially the same time as said first resilient member, and communicate a safety warning if such movement is detected.

9. A brake device as claimed in claim 1, wherein the module is a second module, and the brake device further comprise a first module, the first module comprising:

a damping apparatus configured to dampen the movement of the first movable member or the second movable member upon release of a braking force applied to the input shaft.

10. A brake device as claimed in claim 9, wherein the damping apparatus is configured such that substantially no damping force is applied to the first movable member and/or the second movable member by the damping apparatus upon application of a braking force to the input shaft.

11. A brake device as claimed in claim 9, wherein said damping apparatus comprises a torque or load limiter, or fuse device configured to bypass the damping provided by the damping apparatus.

12. A brake device as claimed in claim 9, wherein the damping apparatus comprises a piston connected to the input shaft and movable within a chamber containing a damping fluid, wherein one or more passages are provided within the piston to allow the damping fluid to flow from one side of the piston to the other;
wherein the one or more passages comprises a first passage comprising a flow restrictor, and the flow restrictor is configured to permit the flow of fluid across the piston via a restriction, such that the flow rate of fluid through the first passage is limited.

13. A brake device as claimed in claim 12, wherein the one or more passages comprises a second passage comprising a check valve, and the check valve is configured to restrict the flow of fluid through the first passage in a first direction, but allow the flow of fluid through the first passage in a second, opposite direction.

14. A brake device as claimed in claim 9, wherein:
the damping apparatus comprises a mechanical friction device configured to apply a frictional resistance to a component associated with the input shaft, thereby slowing the retraction of the input shaft as it travels towards its rest position upon release of a braking force applied to the input shaft; and
the brake device further comprises a ratchet wheel or other device configured to substantially disconnect the mechanical resistance device from the applying a frictional resistance during the application of a braking force to the input shaft.

15. A method of controlling a brake device as claimed in claim 1, the method comprising:
applying a first braking force to the input shaft, wherein the first braking force is sufficient to cause the first resilient member to yield or compress, but insufficient to cause the second resilient member to yield or compress; and
applying a second braking force to the input shaft, wherein the second braking force is higher than the first braking force and is sufficient to cause both the first resilient member and the second resilient member to yield or compress.

16. A brake device as claimed in claim 1, wherein the module provides a two-stage braking system.

17. A brake device as claimed in claim 16, wherein the first braking force corresponds to a dynamical braking stage, and the second braking force corresponds to a static braking stage.

* * * * *